United States Patent [19]
Stasik et al.

[11] Patent Number: 5,664,458
[45] Date of Patent: Sep. 9, 1997

[54] ROLLING START CONTROL SYSTEM/ METHOD FOR SEMI-AUTOMATED MECHANICAL TRANSMISSIONS

[75] Inventors: Anthony Stasik, Coppull; Kwok Wah Chan, Chorley; Ian Richard Joseph Bates, Huddersfield; John Ernest Stainton, Clayton-Le-Woods, all of England

[73] Assignee: Eaton Corporation, Cleveland, Ohio

[21] Appl. No.: 600,583

[22] Filed: Feb. 13, 1996

[51] Int. Cl.$^6$ .................................................. F16H 61/00
[52] U.S. Cl. .......................................... 74/336 R; 477/80
[58] Field of Search .............................. 477/80, 77, 78; 74/335, 336 R; 192/3.63, 3.61

[56] References Cited

U.S. PATENT DOCUMENTS

| | | | |
|---|---|---|---|
| 4,648,290 | 3/1987 | Dunkley et al. | 74/866 |
| 4,735,109 | 4/1988 | Richards et al. | 74/745 |
| 4,754,665 | 7/1988 | Vandervoort | 71/745 |
| 4,913,269 | 4/1990 | Dunkley et al. | 192/3.63 |
| 4,930,078 | 5/1990 | Dunkley et al. | 364/424.1 |
| 4,930,081 | 5/1990 | Dunkley et al. | 364/424.1 |
| 5,054,591 | 10/1991 | Braun | 192/3.63 |
| 5,109,721 | 5/1992 | Boardman et al. | 74/336 R |
| 5,261,288 | 11/1993 | Menig | 74/335 |
| 5,263,379 | 11/1993 | Newbigging et al. | 74/336 R |
| 5,408,895 | 4/1995 | Chan et al. | 74/335 |
| 5,413,012 | 5/1995 | Davis | 74/335 |
| 5,425,284 | 6/1995 | Davis | 74/335 |
| 5,508,916 | 4/1996 | Markyveck et al. | 477/80 X |
| 5,533,946 | 7/1996 | Markyvech | 477/78 |

*Primary Examiner*—Charles A. Marmor
*Assistant Examiner*—Peter T. Kwon
*Attorney, Agent, or Firm*—Howard D. Gordon

[57] ABSTRACT

A control system and method for a semi-automatic mechanical transmission system (10) is provided for sensing rolling start conditions (OS>REF, GR=N, (CLUTCH MANUAL DISENGAGED=TRUE)) and upon sensing such conditions, allowing operator request for a direct shift into an appropriate rolling start gear ratio ($GR_{RS}$) determined as a function of current and/or expected output shaft speed ($GR_{RS} \geq ES_{IDLE}/OS$).

24 Claims, 4 Drawing Sheets

ROLLING START CONTROL SYSTEM/ METHOD FOR SEMI-AUTOMATED MECHANICAL TRANSMISSIONS

RELATED APPLICATIONS

The present application claims priority from GB 9503232.2 filed Feb. 18, 1995, and from GB 9505373.2 filed Mar. 17, 1995.

The present application is related to the following U.S. patent applications, all assigned to the assignee of this application, EATON CORPORATION:

Ser. No. 07/935,937; filed Aug. 27, 1992 START GEAR RATIO CONTROL SYSTEM AND METHOD
Ser. No. 08/104,687; filed Aug. 11, 1993 START RATIO ENGAGEMENT CONTROL SYSTEM AND METHOD
Ser. No. 08/104,698; filed Aug. 11, 1993 START RATIO SELECTION CONTROL SYSTEM AND METHOD
Ser. No. 08/104,699; filed Aug. 11, 1993 SCROLLING GEAR RATIO SELECTION CONTROL SYSTEM AND METHOD

BACKGROUND OF THE INVENTION

1. Field of the Invention

The present invention relates to a control system and method for a semi-automatic mechanical transmission system, including a manually operated shift selector movable in a first direction to request upshifting and in a second direction to request downshifting, for automatically controlling the changing or shifting of transmission gear ratios on a vehicle, while leaving the vehicle driver or operator some residual measure of control. In particular, the present invention relates to a control system and method for the semi-automatic control of a mechanical change gear transmission including means for automatically executing automatically determined and displayed allowable driver selected transmission ratio shifts. Preferably, automatic shift implementation of driven selected shifts includes automatic control of the vehicle master clutch and, in one embodiment, a clutch pedal is provided and the master clutch operation is automated in all but start from stop situations. More particularly, the present invention relates to a system and method for controlling a semi-automatic mechanical transmission wherein under rolling start conditions (i.e., the vehicle ground speed exceeds a minimum reference value and the transmission is in neutral and, alternatively, the master clutch is disengaged), a single upshift request is interpreted as a request for a direct shift into a rolling start ratio ($GR_{RS}$) determined as a function of current or expected vehicle ground speed.

2. Description of the Prior Art

Fully automatic transmission systems, both for heavy-duty vehicles such as heavy-duty trucks and/or coaches, and for automobiles, that sense throttle openings or positions, vehicle speeds, engine speeds and the like, and automatically shift the vehicle transmission in accordance therewith, are well known in the prior art. Such fully automatic change gear transmissions include transmissions wherein pressurized fluid is utilized to frictionally engage one or more members to other members or to a ground to achieve a selected gear ratio and automated mechanical transmissions utilizing electronic, hydraulic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065; 4,361,060; 5,050,079 and 5,109,729, the disclosures of which are incorporated herein by reference.

Such fully automatic change gear transmissions can be unacceptably expensive, particularly for the largest heavy-duty vehicles which are not typically sold in high volumes. Moreover, many vehicle operators like to control the selection of the gear ratios, particularly since they can see and/or know the nature of the road ahead and/or of the load being carried.

These drawbacks have been minimized by providing a semi-automatic mechanical transmission control wherein automatic changing between a plurality of gear ratios is provided while normally permitting the driver to choose when to make a particular gear ratio change and whether to select the immediately consecutive ratio up or down or to skip one or more ratios. Examples of such a semi-automatic mechanical transmission control can be seen by reference to U.S. Pat. Nos. 4,648,290; 4,800,360; 4,930,081 and 4,930,078, the disclosures of which are incorporated herein by reference.

While the above-described semi-automatic mechanical transmission control does provide a very desirable semi-automatic control, the control was subject to improvement as, if the driver or operator desired a shift from neutral into a selected transmission rolling start ratio while the vehicle was in motion, the driver was required to identify the appropriate rolling start ratio, to calculate the number of steps from neutral to the appropriate rolling start ratio and to then move the selector lever that number of times in the upshift direction. This was particularly a concern in modern mechanical transmissions for heavy-duty vehicles which may have 9, 10, 12, 13, 16 or 18 forward speed ratios and wherein any one of the first seven ratios may be appropriate rolling start ratios under certain conditions. Examples of such multi-speed mechanical transmissions may be seen by reference to U.S. Pat. Nos. 4,735,109 and 4,754,665, the disclosures of which are incorporated herein by reference.

SUMMARY OF THE INVENTION

In accordance with the present invention, the drawbacks of the prior art semi-automatic mechanical transmission controls have been minimized or eliminated by the provision of a control system and control method wherein, if the vehicle is in forward motion above a minimum reference speed and the transmission is in neutral, then a single movement of the control lever in the upshift direction is interpreted and executed as a request for a direct shift into a rolling start ratio, determined as a function of current vehicle ground speed.

Accordingly, it is an object of the present invention to provide a new and improved control system/method for semi-automatic mechanical transmissions having a control for automatically determining allowable up and down shifts from a given gear ratio, preferably for automatically displaying same, for automatically executing such permissible gear ratio changes upon selector lever manual selection thereof by the vehicle operator, and wherein the operator can request an automatic shift from neutral into an appropriate rolling start ratio determined as a function of current vehicle ground speed by a single movement of the selector lever in the upshift direction if vehicle ground speed is greater than a minimum ground speed reference value.

This and other objects and advantages of the present invention will become apparent from a reading of the following description of the preferred embodiments taken in connection with the attached drawings.

DESCRIPTION OF THE PREFERRED EMBODIMENT

In the present description of the preferred embodiment, certain terminology will be used for descriptive purposes only and is not intended to be limiting. The terms "upward," "downward," "rightward" and "leftward" will refer to directions in the drawings to which reference is made. The terms "inward" and "outward" refer, respectively, to directions toward and away from the geometric center of the device or portion thereof being described. The above applies to derivatives of the terms above specifically mentioned and terms of similar import.

The term "simple transmission" is used to designate a change speed transmission, wherein the operator may select one of a plurality of single gear reductions. The term "compound transmission" is used to designate a change-speed transmission having a main transmission portion and an auxiliary transmission portion connected in series whereby the selected gear reduction in the main transmission portion may be compounded by further selected gear reduction in the auxiliary transmission portion. The term "splitter-type compound transmission" as used herein will designate a compound transmission wherein the auxiliary transmission is used to provide various selectable steps for subdivisions of the gear ratio selected in the main transmission portion. In a splitter-type compound transmission, the main transmission section typically is provided with relatively wide steps which are split or subdivided by the auxiliary section. As used herein, the term "upshift" shall mean shifting from a lower speed gear ratio into a higher speed gear ratio. As used herein, the term "downshift" shall mean shifting from a higher speed gear ratio to a lower speed gear ratio. The terms "low-speed gear," "low gear" and/or "first gear," as used herein, shall designate the gear ratio utilized for lowest forward speed operation in a transmission or transmission section (i.e., that set of gears having the highest ratio of reduction relative to the input shaft of the transmission).

A "selected direction" of shifting will refer to selection of either single or multiple upshifting or downshifting from a particular gear ratio. The "displacement" between ratios refers to the number of selectable ratios between two given ratios; for example, third speed or gear ratio is displaced by one and two ratios, respectively, from fourth and fifth speed, respectively, in the downshift direction.

The term "blocked transmission" or "blocked transmission section" shall designate a change-gear, constant-mesh transmission or transmission section wherein a selected one of a plurality of axially movable gears is non-rotatably coupled to a shaft as a result of axial movement of the selected gear from the neutral to the engaged position thereof, and by means of a resiliently biased positive clutch and a blocker, is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, the disclosures of which are incorporated herein by reference.

The present invention is applicable, in principle, to the semi-automatic control of any type of mechanical change-gear transmission adaptable for providing input signals to and receiving command signals from electro-pneumatic control devices. However, the semi-automatic control system of the present invention is particularly advantageously applied to a splitter-type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Patent Application No. 82303586.2, published Feb. 9, 1983 (EP-A-0071353) and European Patent Application No. 83307061.8, published Sep. 5, 1984 (EP-A-0117342) and U.S. Pat. No. 4,735,109. Transmissions of the type illustrated in above-mentioned U.S. Pat. No. 4,754,665 also may be advantageous used in connection with the present invention.

The semi-automatic transmission system to which the present invention is particularly advantageously related, is described an illustrated in European Patent application 85305072.2, published Feb. 5, 1986 (EP-A-0 170 465) and U.S. Pat. No. 4,648,290.

Figure 1:
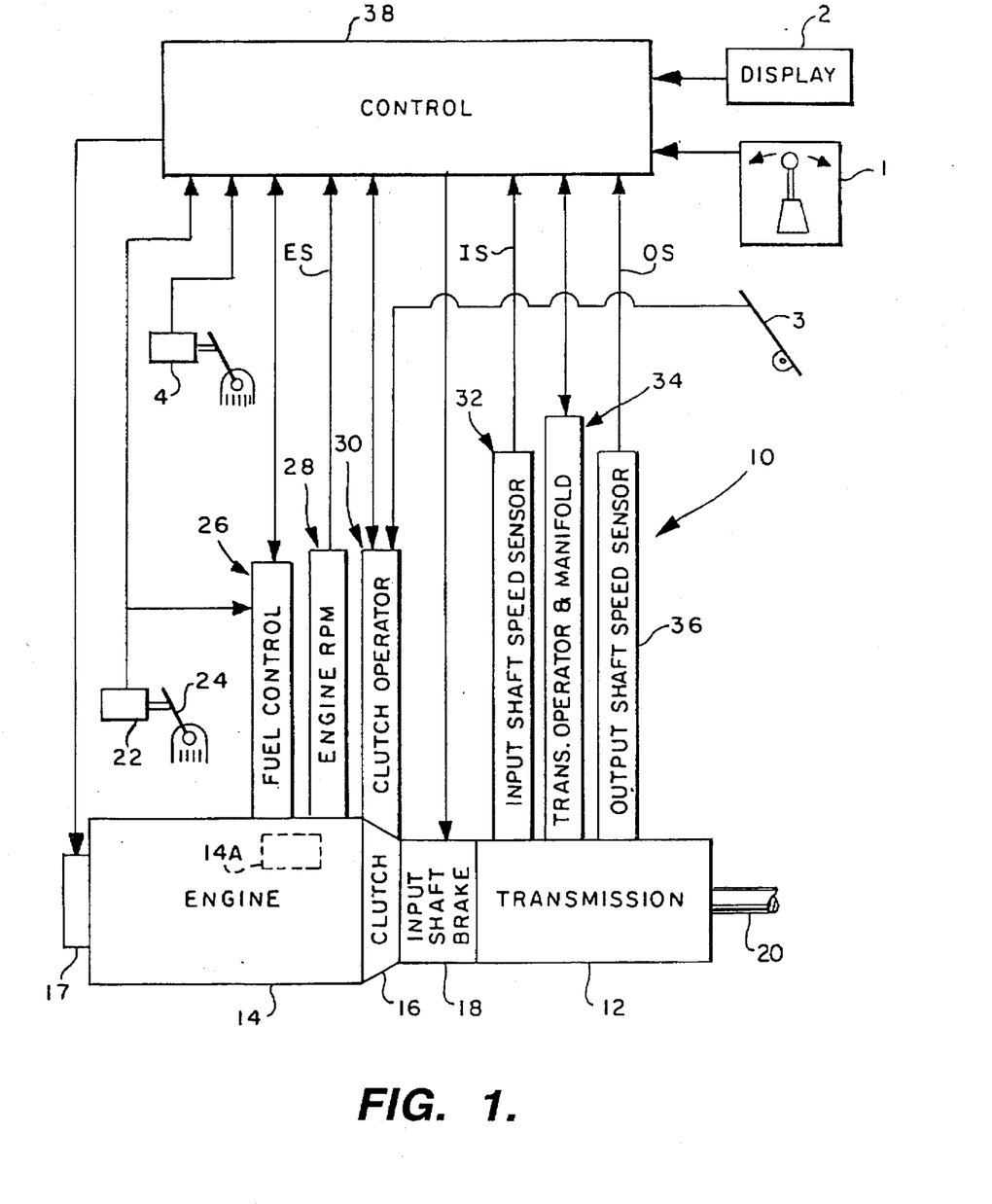
FIG. 1 is a schematic illustration of the semi-automatic mechanical change gear transmission system of the present invention.

Referring to FIG. 1, the position of a driver-operated throttle 24 is sensed at sensor 22 and fed to a central processing unit 38, which also receives inputs relative to engine speed (ES) from sensor 28 and/or transmission input shaft speed (IS) from sensor 32, transmission output shaft speed (OS) from sensor 36, and positive or negative actuations of the driver's gear-shift lever or "joy stick" 1, to be described in greater detail below. It is understood that transmission output shaft speed is an indication of vehicle ground speed and engine speed is an indication of transmission input shaft speed and vice versa, especially if clutch 16 is non-slippingly engaged.

The throttle position sensor 24 may be of the type illustrated in U.S. Pat. No. 4,922,425, the disclosure of which is incorporated herein by reference, which will indicate the presence or absence of the operator's foot on the throttle pedal as well as displacement of the throttle pedal.

Figure 2:
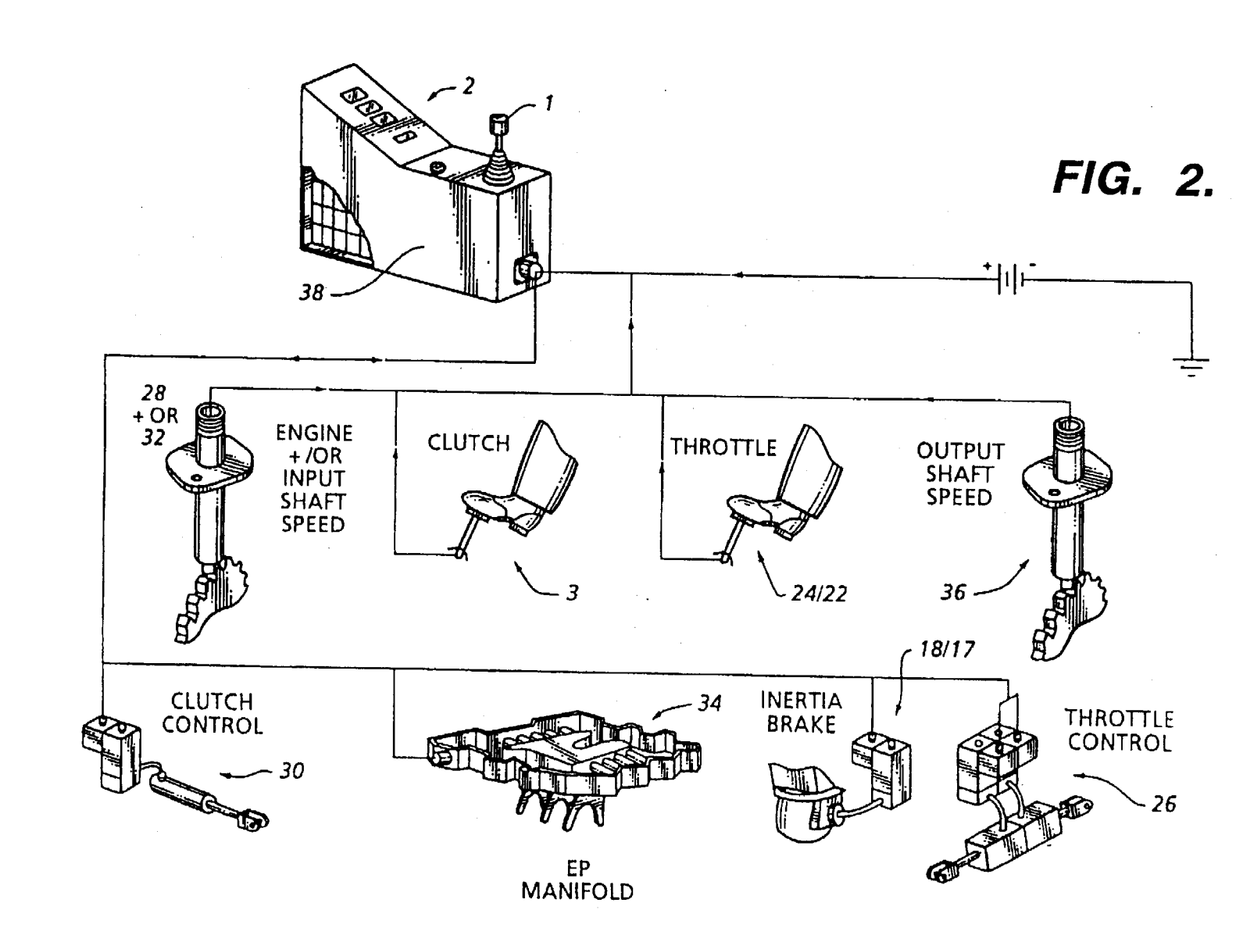
FIG. 2 is a schematic illustration of the control system of the semi-automatic transmission of the present invention.

Control logic circuits, sensors and actuators for the transmission system 10, as disclosed in FIGS. 1 and 2, may be as disclosed in above-mentioned U.S. Pat. Nos. 4,361,060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to control the supply of fuel to the engine 14, clutch control via operator 30 and ratio shifting via transmission operator 34. The transmission operator 34 may also be of the "X–Y" type as illustrated in U.S. Pat. Nos. 4,873,881 and 4,899,607, the disclosures of which are incorporated herein by reference.

The central processing unit also sends command output signals to the display 2 to be described in greater detail below. The semi-automatic transmission system 10 may additionally comprises a usual foot-operated manual clutch control 3 intended for use only for start-from-rest and/or low-speed creeping, maneuvering situations. The control 38 receives signals indicative of manual clutch control 3 position and of actuation of the vehicle brakes 4. The semi-automatic mechanical transmission system 10 also includes sources of electric, hydraulic and/or pneumatic power (not illustrated).

The central processing unit may be of the type illustrated in U.S. Pat. No. 4,595,986 and may incorporate fault detection and tolerance logic of the type illustrated in U.S. Pat. No. 4,849,899; 4,899,279 and 4,945,484, the disclosures of all of which are incorporated by reference. The engine 14 may be electronically controlled and include a dedicated microprocessor 14A, communicating with the controller 38 over an electronic data link conforming to a protocol such as ISO 11898, SAE J1922 or SAE J1939.

Figure 3:
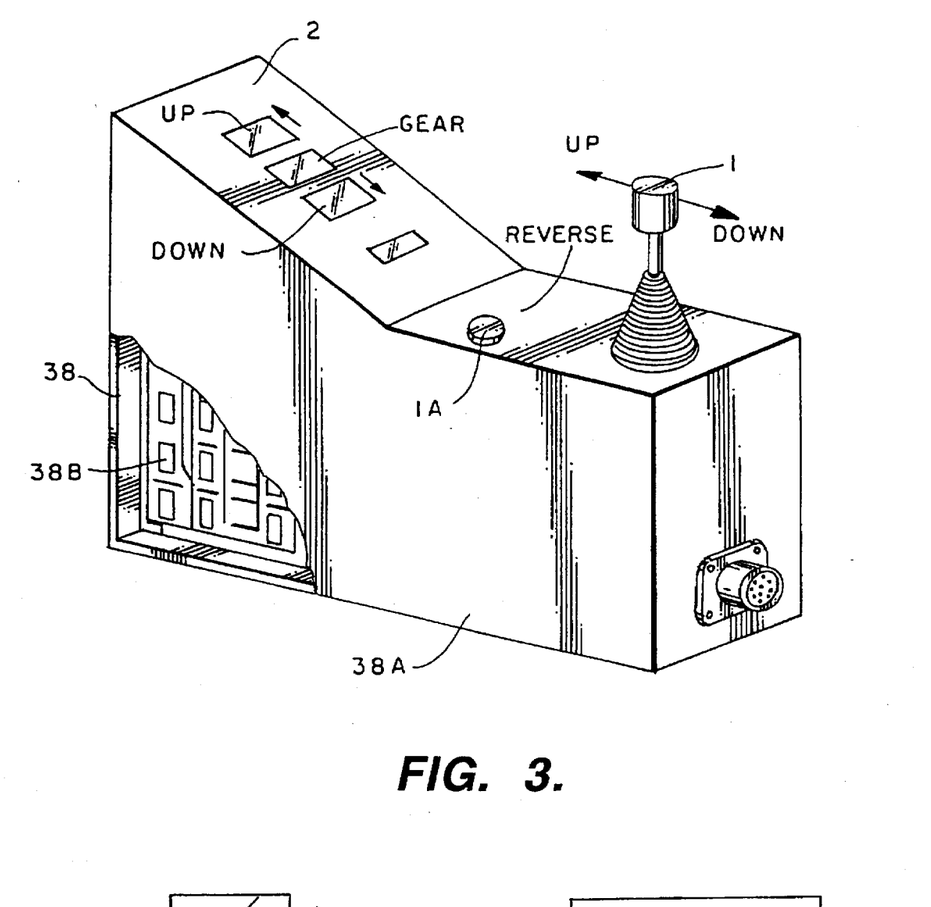
FIG. 3 is a perspective view of the driver's manual shift control and display device.

As may be seen by reference to FIG. 3, the central processing unit 38 may be contained in a box or housing 38A, which housing carries the display panel 2 having an upshift indicator display 2', a downshift indicator display 2", and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Figure 3A:
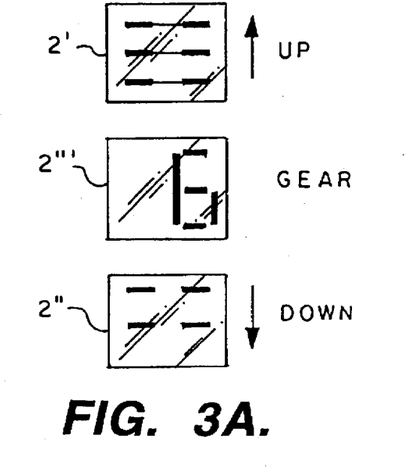
FIGS. 3A and 3B are enlarged views of a portion of the display illustrated in FIG. 3.

Referring to FIG. 3A, the display 2 includes upshift indicator section 2', downshift indicator section 2" and currently engaged gear ratio indicator section 2'''. As illustrated, the currently engaged gear ratio display section 2''' is presently displaying a "6" indicating that the vehicle transmission is operating in sixth gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh, eighth or ninth speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth or fourth gear.

Figure 3B:
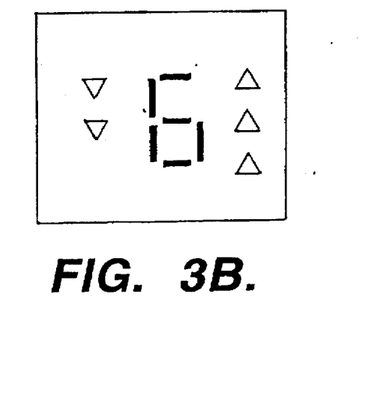

As may be seen by reference to FIG. 3B, the display may use up and down arrows or other symbols in place of the lines.

Briefly, the permissibility of a possible upshift or downshift is determined by comparing the expected engine speed at the completion of such an upshift or downshift, assuming a substantially constant vehicle speed or a calculated expected vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3A, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command even though synchronization of the mechanical jaw clutch elements could be obtained by the system.

To shift transmission 12, the driver moves lever 1 forward (for upshifts) and rearward (for downshifts) from the position illustrated in FIGS. 2 and 3. To select a single upshift (i.e., a shift to seventh gear), the operator will move lever 1 forward once and the lever will then return to the neutral or centered position under bias. If, in sixth gear as shown, the operator moves the lever forward three times in quick succession, then allowing its return to rest, he will skip two gears in effect, and achieve a skip shift directly into ninth speed (i.e., seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38.

Typically, the reverse mode of operation may be achieved only from the neutral, substantially at-rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation. Of course, any type of toggle switch or button which may be located on the end of the shift lever may be utilized in place of reverse enable button 1A.

Upshifts and/or downshifts involving both the main and auxiliary section (i.e., compound shifts) are equally simple for the driver to achieve as are those involving only the auxiliary section (i.e., a split shift). In those transmissions provided with multiple reverse gear ratios, the transmission may be downshifted into lower reverse ratios and upshifted into higher reverse ratios by movement of the control lever backward and forward as indicated.

It is understood that a single control lever movable forward and backward in a given direction to select a forward and reverse mode of operation, and then movable in a transverse direction to select upshifts and downshifts either single or multiple (of the type disclosed in U.S. Pat. No. 4,442,730, the disclosure of which is incorporated herein by reference), may be substituted for the control lever I illustrated. The selection lever 1 also may be replaced by any other type of selection device having a non-displaced condition and two distinct displaced conditions, such as a rocker switch, a pair of buttons or the like. It also is understood that at least some embodiments of the present invention are applicable to transmission systems similar to system 10 but having fully automatic clutch operators.

It is a preferred feature of the semi-automatic control system of the present invention that, whenever the vehicle is brought to a complete stop, the clutch 16 is disengaged and the transmission is engaged in a relatively high gear ratio and the lever 1 is moved once in the downshift direction, the control will automatically shift transmission 12 to preferably neutral, or alternatively, a preselected starting gear, which may involve skip-shifting over a large plurality of intervening gear ratios. By way of example, in a twelve forward speed transmission, the permissible start-from-stop ratios may be first through fifth gears. After in the preselected start ratio, another lever movement in the downshift direction will shift the transmission one ratio lower and another movement in the upshift direction will shift the transmission one ratio higher. The operator, at rest or in motion, can always select a gear ratio from those permitted. The manual clutch pedal, if utilized, is only intended for use preparatory to stopping to disengage the transmission and avoid stalling and during starting from rest in any of the permissible starting gear ratios.

The preselected start-from-stop gear ratio may be preset and fixed, may be selectable by the operator, may be determined by the electronic control unit in view of inputs and predetermined logic rules, or may simply be the last actually utilized start ratio.

A single movement or pulse of the lever is a movement of the lever from the centered position to a displaced position, in either the upshift or downshift direction; and then the substantially immediate release of the lever allowing the lever to return to the centered position thereof. If the control lever 1 is retained in the displaced position for more than a predetermined period of time (for example, for more than one or two seconds), an alternate control logic may be utilized.

Figure 4:
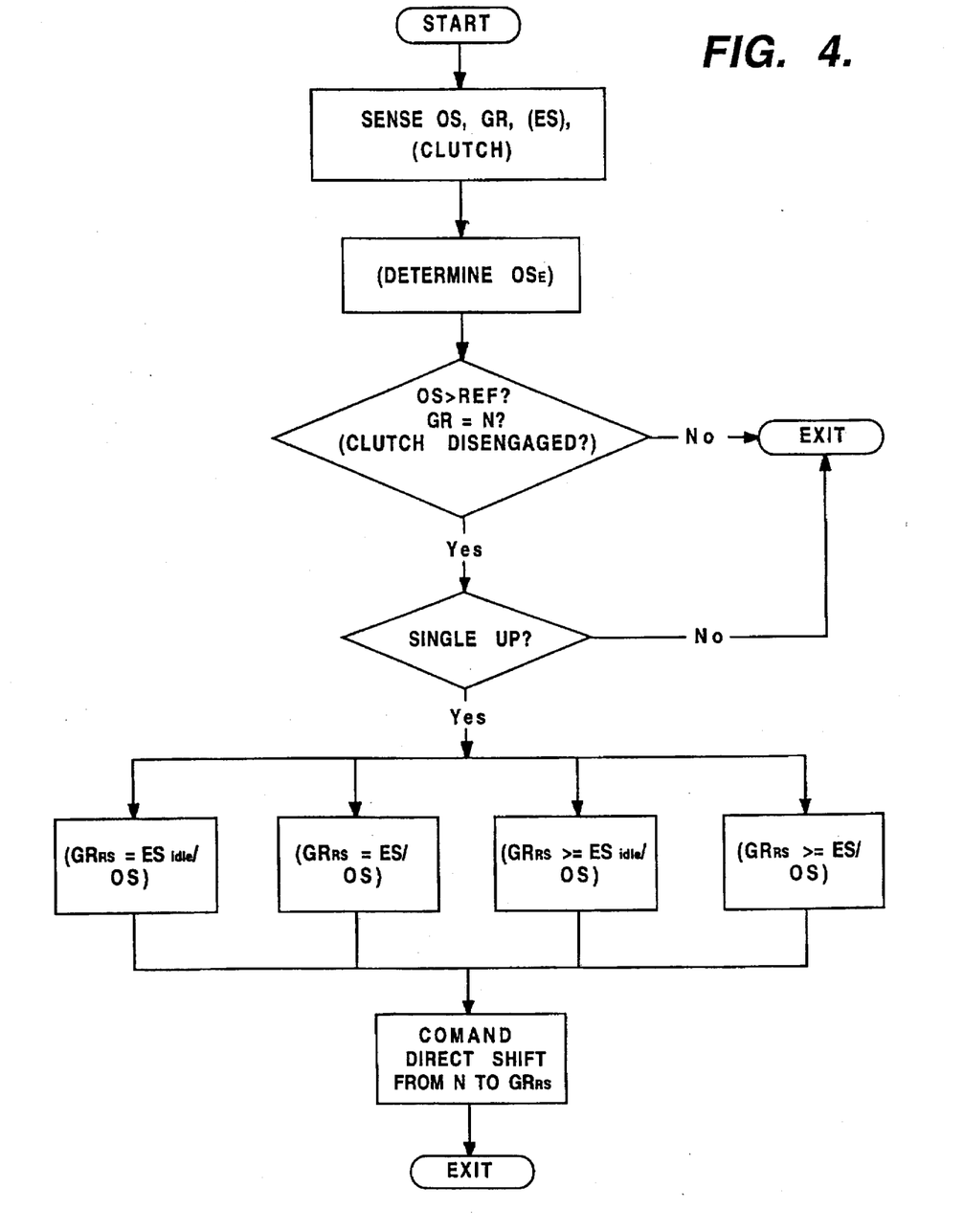
FIG. 4 is a schematic illustration, in flow chart format, of the control system/method of the present invention.

According to the present invention, as schematically illustrated in flow chart format in FIG. 4, if the vehicle is in a "rolling start" mode (i.e., if ground speed is greater than a minimum reference value (OS>REF where REF equals, for example, about 50 RPM)) and the transmission is in neutral (GR=N), the controller 38 will interpret and execute a single movement of shift selector 1 in the upshift direction as a request for a direct shift from neutral into a determined rolling start gear ratio ($GR_{RS}$) where the rolling start gear ratio is a function of current vehicle speed.

In one embodiment of the present invention, the rolling start gear ratio is selected so that input shaft speed (IS=OS * $GR_{RS}$) will be equal to or slightly greater than current engine speed ($ES_{IDLE} \leq OS * GR_{RS}$), or alternatively, greater than engine idle speed ($ES_{IDLE} \leq OS * GR_{RS}$), which will assure that engagement of the clutch and/or the rolling start ratio will not cause an unexpected or undesirable vehicle acceleration.

In one embodiment of the present invention, sensing manual disengagement of the master clutch 16 is a precondition to sensing rolling start conditions, while in an alternate embodiment, the condition of the master clutch is not a control parameter.

In a further embodiment of the present invention, the rolling start gear ratio is selected to provide an input shaft speed most closely matched to engine speed and may be slightly greater than or slightly less than engine speed (ES≅OS * $GR_{RS}$).

Alternatively, the selection of the rolling start gear ratio may be a function of the expected output shaft speed ($OS_E$) at time of engaging the start ratio where in expected output shaft speed is determined as a function of current output shaft speed ($OS_C$), rate of change of current output shaft speed (dOS/dt) and the reaction time of the system actuators.

In the flow chart of FIG. 4, alternatives are parenthetically indicated.

By the above-described procedures, the vehicle operator, with a single movement of the control lever, may request a direct shift into an appropriate rolling start gear ratio ($GR_{RS}$) from neutral, which request will be automatically implemented by the semi-automated mechanical transmission system 10.

Although the preferred embodiment of the present invention has been described with a certain degree of particularity, various changes to form and detail may be made without departing from the spirit and scope of the invention as hereinafter claimed.

We claim:

1. A method of controlling a semi-automatic mechanical change gear transmission system (10) comprising a fuel-throttle-controlled engine (14) having a known idle speed ($ES_{IDLE}$), a multi-speed change-gear mechanical transmission (12), a friction master clutch (16) interposed between the engine and transmission, a manually operated shift selection lever (1) movable in a first direction from a centered position to select upshifts and in a second direction from said centered position to select downshifts from the currently engaged gear ratio, a central processing unit (38) for receiving inputs indicative of transmission engaged ratio, of vehicle speed (OS) and of operation of said manual shift selection lever and for processing same according to predetermined logic rules to issue command output signals to non-manually controlled operators including a fuel throttle control operator (26) and a transmission operator (34), said method comprising:

determining currently engaged transmission ratio;
determining current vehicle speed; and
if said transmission is in neutral (GR=N) and said vehicle speed exceeds a minimum reference value (OS>REF), automatically selecting operation in a rolling start mode of operation wherein a single movement of said shift selection lever in the upshift direction is interpreted as an operator selection of a direct shift from neutral into an appropriate rolling start gear ratio ($GR_{RS}$), said appropriate rolling start ratio determined as a function of current vehicle speed.

2. The method of claim 1 wherein said system includes a manual clutch operator 3, said input signals include a signal indicative of manual disengagement of said clutch and operation in said rolling start mode of operation further requires sensing manual disengagement of said clutch.

3. The method of claim 1 or 2 wherein said input signal indicative of vehicle speed is a signal indicative of transmission output shaft speed and said appropriate rolling start gear ratio is selected such that the numerical ratio thereof is equal to or greater than the quotient of said engine idle speed divided by current output shaft speed ($GR_{RS} \geq ES_{IDLE}/OS$).

4. The method of claim 1 or 2 wherein said input signal indicative of vehicle speed is a signal indicative of transmission output shaft speed, said input signals include a signal indicative of current engine speed (ES) and said appropriate rolling start gear' ratio is selected such that the numerical ratio thereof is equal to or greater than the quotient of current engine speed divided by current output shaft speed ($GR_{RS} \geq ES/OS$).

5. The method of claim 1 or 2 wherein said input signal indicative of vehicle speed is a signal indicative of transmission output shaft speed, said input signals include a signal indicative of current engine speed (ES) and said appropriate rolling start gear ratio is selected such that the numerical ratio thereof is substantially equal to the quotient of current engine speed divided by current output shaft speed ($GR_{RS} \cong ES/OS$).

6. The method of claim 1 or 2 wherein said input signal indicative of vehicle speed is a signal indicative of transmission output shaft speed, and said appropriate rolling start gear ratio is selected such that the numerical ratio thereof is substantially equal to the quotient of engine idle speed divided by current output shaft speed ($GR_{RS} \cong ES_{IDLE}/OS$).

7. A system of controlling a semi-automatic mechanical change-gear transmission system (10) comprising a multiple-speed, change-gear mechanical transmission (12) and a manually operated shift selection device (1) for selecting upshifts and downshifts, a processing unit (38) for receiving inputs, including inputs indicative of operation of said shift selection device, and for processing same according to predetermined logic rules to determine currently engaged and allowably engaged gear ratios and to issue command output signals to non-manually controlled operators including a transmission operator (34), said processing unit sensing operation of said manual shift selection device including selection of a shift in the upshift or downshift direction and duration of selection operation, said logic rules including rules effective for determining the transmission gear ratio selected by the operator to be shifted directly into from the currently engaged ratio by assuming selection of a shift in a given direction for a time duration less than a reference period of time indicates operator selection of a change of one ratio in said direction; said system characterized by:

said logic rules including rules effective if selection of a shift in at least one of said upshift and downshift directions occurs for a time duration exceeding said reference period of time, then assuming operator selection of a direct skip shift in said direction.

8. The method of claim 7 wherein said input signal indicative of vehicle speed is a signal indicative of current transmission output shaft speed ($OS_c$), an expected output shaft speed ($OS_E$) is determined as a function of current output shaft speed ($OS_c$), the rate of change of current output shaft speed ($dOS_c/dt$) and reaction time of said operators, and said appropriate rolling start gear ratio is selected such that the numerical ratio thereof is equal to or greater than the quotient of said engine idle speed divided by expected output shaft speed ($GR_{RS} \geq ES_{IDLE}/OS_E$).

9. The method of claim 7 wherein said input signal indicative of vehicle speed is a signal indicative of current transmission output shaft speed ($OS_c$), an expected output shaft speed ($OS_E$) is determined as a function of current output shaft speed ($OS_c$), the rate of change of current output shaft speed ($dOS_c dt$) and reaction time of said operators, said input signals include a signal indicative of current engine speed (ES) and said appropriate rolling start gear ratio is selected such that the numerical ratio thereof is equal to or greater than the quotient of current engine speed divided by expected output shaft speed ($GR_{RS} \geq ES/OS_E$).

10. The method of claim 7 wherein said input signal indicative of vehicle speed is a signal indicative of current transmission output shaft speed ($OS_c$), an expected output shaft speed ($OS_E$) is determined as a function of current output shaft speed ($OS_c$), the rate of change of current output shaft speed ($dOS_c dt$) and reaction time of said operators, said input signals include a signal indicative of current engine speed (ES) and said appropriate rolling start gear ratio is selected such that the numerical ratio thereof is substantially equal to the quotient of current engine speed divided by expected output shaft speed ($GR_{RS} \cong ES/OS_E$).

11. The method of claim 7 wherein said input signal indicative of vehicle speed is a signal indicative of current transmission output shaft speed ($OS_c$), an expected output shaft speed ($OS_E$) is determined as a function of current output shaft speed ($OS_c$), the rate of change of current output shaft speed ($dOS_c/dt$) and reaction time of said operators, and said appropriate rolling start gear ratio is selected such that the numerical ratio thereof is substantially equal to the quotient of engine idle speed divided by expected output shaft speed ($GR_{RS} \cong ES_{IDLE}/OS_E$).

12. A machine for controlling a semi-automatic mechanical change gear transmission system (10) comprising a fuel-throttle-controlled engine (14) having a known idle speed ($ES_{IDLE}$), a multi-speed change-gear mechanical transmission (12), a friction master clutch (16) interposed between the engine and transmission, a manually operated shift selection lever (1) movable in a first direction from a centered position to select upshifts and in a second direction from said centered position to select downshifts from the currently engaged gear ratio, a central processing unit (38) for receiving inputs indicative of transmission engaged ratio, of vehicle speed (OS) and of operation of said manual shift selection lever and for processing same according to predetermined logic rules to issue command output signals to non-manually controlled operators including a fuel throttle control operator (26), and a transmission operator (34), said machine characterized by said logic rules including logic rules for:

if said transmission is in neutral (GR=N) and said vehicle speed exceeds a minimum reference value (OS>REF), automatically selecting operation in a rolling start mode of operation, wherein a single movement of said shift selection lever in the upshift direction is interpreted as an operator selection of a direct shift from neutral into an appropriate rolling start gear ratio ($GR_{RS}$), said appropriate rolling start ratio determined as a function of current vehicle speed.

13. The machine of claim 12 wherein said system includes a manual clutch operator 3, said input signals include a signal indicative of manual disengagement of said clutch and automatic selection of operation in said rolling start mode of operation further requires sensing manual disengagement of said clutch.

14. The machine of claim 12 or 13 wherein said input signal indicative of vehicle speed is a signal indicative of transmission output shaft speed and said appropriate rolling start gear ratio is selected such that the numerical ratio thereof is equal to or greater than the quotient of said engine idle speed divided by current output shaft speed ($GR_{RS} \geq ES_{IDLE}/OS$).

15. The machine of claim 12 or 13 wherein said input signal indicative of vehicle speed is a signal indicative of transmission output shaft speed, said input signals include a signal indicative of current engine speed (ES) and said appropriate rolling start gear ratio is selected such that the numerical ratio thereof is equal to or greater than the quotient of current engine speed divided by current output shaft speed ($GR_{RS} \geq ES/OS$).

16. The machine of claim 12 or 13 wherein said input signal indicative of vehicle speed is a signal indicative of transmission output shaft speed, said input signals include a signal indicative of current engine speed (ES) and said appropriate rolling start gear ratio is selected such that the numerical ratio thereof is substantially equal to the quotient of current engine speed divided by current output shaft speed ($GR_{RS} \approx ES/OS$).

17. The machine of claim 12 or 13 wherein said input signal indicative of vehicle speed is a signal indicative of transmission output shaft speed, and said appropriate rolling start gear ratio is selected such that the numerical ratio thereof is substantially equal to the quotient of engine idle speed divided by current output shaft speed ($GR_{RS} \approx ES_{IDLE}/OS$).

18. The machine of claim 12 or 13 wherein said appropriate rolling start ratio is also determined as a function of the rate of change of current vehicle speed.

19. The machine of claim 18 wherein said input signal indicative of vehicle speed is a signal indicative of current transmission output shaft speed ($OS_c$), an expected output shaft speed ($OS_E$) is determined as a function of current output shaft speed ($OS_c$), the rate of change of current output shaft speed ($dOS_c/dt$) and reaction time of said operators, and said appropriate rolling start gear ratio is selected such that the numerical ratio thereof is equal to or greater than the quotient of said engine idle speed divided by expected output shaft speed ($GR_{RS} \geq > ES_{IDLE}/OS_E$).

20. The machine of claim 18 wherein said input signal indicative of vehicle speed is a signal indicative of current transmission output shaft speed ($OS_c$), an expected output shaft speed ($OS_E$) is determined as a function of current output shaft speed ($OS_c$), the rate of change of current output shaft speed ($dOS_c/dt$) and reaction time of said operators, said input signals include a signal indicative of current engine speed (ES) and said appropriate rolling start gear ratio is selected such that the numerical ratio thereof is equal to or greater than the quotient of current engine speed divided by expected output shaft speed ($GR_{RS} \approx ES/OS_E$).

21. The machine of claim 18 wherein said input signal indicative of vehicle speed is a signal indicative of current transmission output shaft speed ($OS_c$), an expected output shaft speed ($OS_E$) is determined as a function of current output shaft speed ($OS_c$), the rate of change of current output shaft speed ($dOS_c/dt$) and reaction time of said operators, said input signals include a signal indicative of current engine speed (ES) and said appropriate rolling start gear ratio is selected such that the numerical ratio thereof is substantially equal to the quotient of current engine speed divided by expected output shaft speed ($GR_{RS} \approx ES/OS_E$).

22. The machine of claim 18 wherein said input signal indicative of vehicle speed is a signal indicative of current transmission output shaft speed ($OS_c$), an expected output shaft speed ($OS_E$) is determined as a function of current output shaft speed ($OS_c$), the rate of change of current output shaft speed ($dOS_c/dt$) and reaction time of said operators, and said appropriate rolling start gear ratio is selected such that the numerical ratio thereof is substantially equal to the quotient of engine idle speed divided by expected output shaft speed ($GR_{RS} \approx ES_{IDLE}/OS_E$).

23. The method of claim 2 wherein said non-manually controlled operators include a clutch operator (30).

24. The machine of claim 13 wherein said non-manually controlled operators include a clutch operator (30).

* * * * *